(12) United States Patent
Fujita (10) Patent No.: US 8,414,078 B2
(45) Date of Patent: Apr. 9, 2013

(54) HEAD REST APPARATUS

(75) Inventor: Masaru Fujita, Kani (JP)

(73) Assignee: Tokai Chemical Industries, Ltd., Kani-Gun (JP)

( * ) Notice: Subject to any disclaimer, the term of this patent is extended or adjusted under 35 U.S.C. 154(b) by 0 days.

(21) Appl. No.: 12/812,334

(22) PCT Filed: Nov. 2, 2009

(86) PCT No.: PCT/JP2009/068765
§ 371 (c)(1),
(2), (4) Date: Jul. 9, 2010

(87) PCT Pub. No.: WO2010/061714
PCT Pub. Date: Jun. 3, 2010

(65) Prior Publication Data
US 2010/0283307 A1    Nov. 11, 2010

(30) Foreign Application Priority Data
Nov. 28, 2008   (JP) ................................. 2008-304421

(51) Int. Cl.
*A47C 7/38* (2006.01)
(52) U.S. Cl.
USPC ......................................... 297/408; 297/391
(58) Field of Classification Search .................. 297/408, 297/391
See application file for complete search history.

(56) References Cited

U.S. PATENT DOCUMENTS

| 5,236,246 A * | 8/1993 | Harrell .......................... 297/408 |
| 2001/0004167 A1* | 6/2001 | Takeda et al. .................. 297/408 |
| 2004/0036340 A1* | 2/2004 | Imayou et al. ................. 297/408 |

FOREIGN PATENT DOCUMENTS

| JP | U 56-48618 | 4/1981 |
| JP | U 56-76076 | 6/1981 |
| JP | U 56-76706 | 6/1981 |
| JP | A 2001-124023 | 5/2001 |
| JP | A 2002-000388 | 1/2002 |
| JP | A 2003-225137 | 8/2003 |

OTHER PUBLICATIONS

International Search Report issued in corresponding International Application No. PCT/JP2009/068765, mailed Dec. 1, 2009. (with English-language translation).

* cited by examiner

*Primary Examiner* — Anthony D Barfield
(74) *Attorney, Agent, or Firm* — Oliff & Berridge, PLC (57) ABSTRACT

In the head rest apparatus, a core member is separately formed from a metal plate and a metal stay, wherein a fixing member is integrally formed on a first divided body of the core member and the fixing member mechanically engages the flat plate portion of the metal plate with the first divided body and fixes the flat plate portion to the first divided body. The flat plate position is tightly fixed to the first divided body. Since the stress can be absorbed only by the first divided body, generation of abnormal noise can be prevented without using any damper member and in addition, rattling in operation can be prevented as well.

10 Claims, 8 Drawing Sheets

HEAD REST APPARATUS

TECHNICAL FIELD

This invention relates to a head rest apparatus adapted to be used by being supported on a seat back or the like of an automobile, and more particularly, a head rest apparatus, the position of which is adjustable in a front/rear direction considering the head position of an occupant of the automobile by swinging or rotating a main body of the head rest apparatus relative to a metal stay.

BACKGROUND OF THE TECHNOLOGY

As an example of the head rest apparatus of the type above, a head rest apparatus is disclosed in a Japanese Patent Publication 2002-000388 A. The head rest apparatus according to this publication includes an approximately reverse U-shaped metal stay formed by a pair of vertical support rod portions supported on the seat back and a horizontal support rod portion connecting both ends of the pair of vertical support rod portion, respectively, a metal plate rotatably supported on the horizontal support rod portion, having a pre-set frictional force relative to the horizontal support rod portion and a resin cover formed to enclose the metal plate and the metal stay therein.

The head rest apparatus is manufactured by the steps of placing the resin cover enclosing therein the metal plate and the metal stay within a foam forming die, integrally molding the resin cover with a pad portion made of foam urethane surrounding the resin cover, and then covering with a surface sheet to complete the head rest. According to the head rest explained above, since the metal plate is integrally formed with the resin cover by embedding the metal plate in the resin cover, by fixing the pair of vertical support rod portions projecting downwardly from a head rest main body to the seat back, the head rest main body is rotated together with the metal plate centering on the horizontal support rod portion thereby adjusting the position of the head rest in a front/rear direction to agree with the head position of the occupant of the automobile.

According to the head rest apparatus above, the metal plate and the metal stay are placed in a forming die and integrally formed with the resin cover by injection molding. However, the vertical support rod portion is variously shaped depending on the type and some of them have a bent portion bent towards vehicle front/rear direction. In such bent shaped type, it was difficult to remove a formed product from a mold. Accordingly, the technology disclosed in the publication lacks versatility. Further, if bending machining for the metal stay is not accurate, sealing performance may be reduced during injection molding process. Still further, since the metal plate and metal stay are integrally formed with the resin cover, separation work is difficult and accordingly recycling of material becomes difficult as well.

According to another type head rest apparatus disclosed in a Patent Publication JP2003-225137 A, a head rest apparatus is proposed in which, first, a resin cover is formed separately from a metal plate and then integrated therewith. The head rest apparatus includes the resin cover covering the metal plate and at least a portion of a metal stay and a space allowing a movement of vertical support rod portions therein. Thus, the resin cover is manufactured separately from the metal plate and the metal stay which are tucked into the cover inside thereby to improve versatility and to make metal recycling easier.
Patent Document 1: JP2002-000388 A
Patent Document 2: JP2003-225137 A

DISCLOSURE OF INVENTION

Problems to be Solved

Since the resin cover disclosed in the Patent Publication 2 is formed by a front cover and a rear cover and these two are connected in male/female mating by sandwiching the metal plate and the metal stay. However, the resin to resin connection may generate a gap between the resin cover and the metal plate or the resin cover and the metal stay due to the contraction after molding or depending on the accuracy in shape of metal plate. Further, since the metal plate and the metal stay are fixed by sandwiching thereof with the front and rear resin covers, the connection between the front and rear covers may loosen due to the vibration from the seat back and the gap between the resin and metal may be also generated.

When such gap is generated, resin cover and the metal plate or resin cover and the metal stay hit or bump each other due to the vibration generated under the vehicle being running and such hitting generates an abnormal noise.

Therefore, in order to prevent generation of abnormal noise, a damper member, made of such as for example, a slab urethane sheet is interposed between the resin cover and the metal plate or the resin cover and the metal stay or the front and rear covers are fixed by means of adhesive tape. The method however, needs more number of parts and assembling man-hours.

Further, according to the conventional method, the metal plate is frictionally rotated relative to the horizontal support rod portion of the metal stay upon adjusting the position in a front/rear direction by swinging or rotating the head rest main body. Upon such adjustment, stress is applied partially on the connecting surface of the front and rear covers and the stress may loosen the connection therebetween to generate a rattling or clattering in operation.

This invention was made considering the above and the object of the invention is to provide a head rest apparatus having a resin cover made separately from a metal plate and a metal stay which can prevent abnormal noise generation without using any damper material and at the same time prevent any rattling.

Means for Solving the Problem

The head rest apparatus of this invention made for solving the above problems is characterized in that the head rest apparatus includes a reverse U-shaped metal stay having a pair of leg portions spaced from each other and extending approximately in a parallel direction and a horizontal rod connecting the pair of leg portions, a metal plate wrapped around the horizontal rod of the metal stay so that a predetermined friction resistance is generated on the rod and frictionally rotating relative to the horizontal rod and a resin-made core member surrounding at least the horizontal rod of the metal stay, the metal plate and a portion of the pair of leg portions, wherein the core member is integrally formed with a first divided body and a second divided body each molded separately and the core member includes an inner space which allows a movement of the pair of leg portions, the metal plate includes a securing portion secured to the horizontal rod and a flat plate portion projecting from the securing portion towards an extending direction of the leg portions, wherein the first divided body includes a fixing means for mechanically engaging the flat plate portion to the first divided body to fix therebetween.

The Effects of the Invention

According to the head rest apparatus of the invention, the flat plate portion of the metal plate is tightly fixed to the first divided body by means of a fixing means integrally formed with the first divided body. Accordingly, even when the vibration is transmitted from the seat back to the metal plate or metal stay, the stress applied from the flat plate portion is transmitted only to the first divided body and no loosening of the connecting surface between the first and the second divided bodies. Further, when the head rest position is adjusted in a front/rear direction by swinging the head rest main body, the stress applied from the flat plate portion is transmitted only to the first divided body and the stress is absorbed within the first divided body, not to loosen the connection strength between the first and the second divided bodies. Thus, without using any damping material, the generation of rattling in operation or abnormal noise can be surely prevented.

It is preferable for a fixing means to provide a contact surface to be in contact with the front side surface of the flat plate portion. Since the fixing means includes a contact surface, the loosening of the flat plate portion from the first divided body can be surely prevented and thereby to prevent generation of rattling in operation.

It is preferable to provide a support portion to be in contact with at least a portion of the rear side surface of the flat plate portion at the first divided body and it is also preferable to hold the flat plate portion by sandwiching the flat plate portion between the contact surface and the support portion. By thus structuring, the flat plate portion is further tightly fixed to the first divided body to surely prevent rattling in operation.

It is preferable to provide a guide portion such as a tapered surface on the fixing means for guiding the flat plate portion along the contact surface. By providing the guide portion, the assembling workability of the first divided body to the metal plate is improved.

It is preferable to form the support portion at least on two portions of the first divided body and form the fixing means between the two support portions. Thus, the flat plate portion can be fixed at least with three points to further assure the fixing strength.

It is preferable to provide the flat plate portion having an approximately rectangular shape and the fixing means having a pair of holding pawls including a pair of root portions respectively facing a corresponding pair of edge surfaces of the flat plate portion extending in parallel to each other and a pair of head portions projecting from the pair of root portions facing each other and covering a portion of the front side surface of the flat plate portion thereby the lower surface of the head portions forming the contact surface and the head portions of the pair of holding pawls and the support portions sandwiching the flat plate portion. Since the flat plate portion is sandwiched by the head portions of the pair of holding pawls and the support portions, the metal plate can be tightly fixed to the first divided body. Further, when the head rest main body is rotated to adjust the front/rear position thereof, the stress is only applied on the first divided body and the first divided body is tightly held by the holding pawls to absorb the stress by the first divided body alone. The connection between the first and the second divided bodies would not be loosened thereby to prevent rattling operation or generation of abnormal noise.

It is preferable to provide a second pawl having a root portion facing an edge surface other than the pair of edge surfaces of the flat plate portion mutually extending in parallel and a head portion extending from the root portion and covering a portion of the front side surface of the flat plate portion on the first divided body and to hold the flat plate portion by sandwiching with the head portion of the second holding pawl and the support plate in addition to the pair of holding pawls. Thus structured, the number of holding pawl is increased to accordingly increase the strength of holding of the flat plate portion and when fixing, first, the flat plate portion is engaged with the second pawl and then engaged with the pair of holding pawls to easily fix the flat plate portion to the first divided body applying the principle of leverage.

It is preferable to define a distance between the flat surface of the head portion including the surface to contact with the flat plate portion and the flat surface of the support portion to be equal to or less than the thickness of the flat plate portion. By thus defining, the flat plate portion can be further tightly fixed to the first divided body using a pushing force from the head portion due to an elastic force generated at the root portion.

It is further preferable to provide the second divided body with a second connecting pin to be engaged with a first connecting pin and having a second stepped portion which is in contact with the front side surface of the flat plate portion. By thus structuring, a possible floating-up of the flat plate portion due to connection loosening can be surely prevented.

Further, by placing the first divided body at rear side of the head rest apparatus and the second divided body at the front side of the head rest apparatus, the flat surface area of the first divided body can be broadly provided to support the flat plate portion with a wider range thereby to strengthen the fixing force.

EXPLANATION OF NUMERALS IN THE ATTACHED DRAWINGS

Numeral 1 designates a metal stay, numeral 2 designates a metal plate, numeral 3 designates a core member, numeral 4 designates a first divided body, numeral 5 designates a second divided body, numeral 10 designates a leg portion, numeral 11 designates a horizontal rod, numeral 20 designates a securing portion and numeral 21 designates a flat plate portion.

THE BEST MODE EMBODIMENTS OF THE INVENTION

The head rest apparatus according to the invention is provided with a metal stay, a metal plate and a core member. The metal stay is the one used conventionally and having approximately reverse U-shape. The metal stay includes a pair of leg portions to be inserted into a seat back and extending approximately in parallel with each other with a distance separated with each other and a horizontal rod connecting the pair of leg portions.

The metal plate includes a securing portion wrapped around and secured to the horizontal rod of the metal stay such that a certain frictional resistance can be generated therebetween and a flat plate portion extending from the securing portion towards the extending direction of the leg portions. Accordingly, the metal plate can be rotatable around the horizontal rod but secured to the rod giving a frictional resistance between the securing portion and the horizontal rod to an extent that the metal plate would not rotate by a pressure from a head of an occupant of the seat.

The core member encloses at least the horizontal rod of the metal stay and a portion of the pair of leg portions of the metal plate. The core member is formed by a first divided body and a second divided body both being made of resin. By forming the first and second divided bodies integrally, a space is formed inside the core, in which the pair of leg portions of the metal stay can be movable. The first divided body is provided with a support portion which contacts with a rear side surface of the flat plate portion and at least a pair of holding pawls formed integrally. It is desirable to use the support portion and the holding pawls as a fixing means.

The most characteristic feature of the invention is that the flat plate portion of the metal plate is mechanically engaged with and fixed to the first divided body by the fixing means which is formed integrally with the first divided body. This fixing means fixes the flat plate portion to the first divided body and it is desirable to fix the flat portion to the first divided body by sandwiching the flat plate portion from both sides. It is desirable to structure the fixing means to at least have a pair of holding pawls which includes a pair of root portions, each facing each of a pair of edge surfaces of the flat plate portion extending in parallel with each other, when the flat plate portion is formed with a rectangular shape and a pair of head portions projecting from the pair of root portions facing with each other and covering a portion of the front side surface of the flat plate portion. A contact surface is formed where the front side surface of the flat plate portion is in contact with an under surface of the head portion of the holding pawls.

The first divided body is preferably provided with a support portion which supports the flat plate portion by contacting at least a portion of the rear side surface of the flat plate portion and the flat plate portion is preferably fixed by sandwiching the flat plate portion between the contact surface and the support portion. When the fixing means is formed by the above explained pair of holding pawls, it is desirable to have the flat plate portion to be sandwiched between the surface of the support portion and the under surface of the head portion of the pair of holding pawls.

In this embodiment, the support portion has only to be provided with a surface which contacts with the rear side surface of the flat plate portion and the providing position is not particularly designated as long as it is within the area of positioning the flat plate portion. A conventional positioning is performed by inserting a connecting pin projecting from the first divided body into a through hole formed in the flat plate portion. It is preferable to form a stepped portion at the connecting pin so that the stepped portion makes contact with the rear side surface of the flat plate portion around the periphery of the through hole. The stepped portion forms the support portion.

It is preferable to further provide a second pawl having a root portion facing on an edge surface other than the pair of edge surfaces of the flat plate portion extending mutually in parallel and a head portion extending from the root portion and covering a portion of the front side surface of the flat plate portion on the first divided body and hold the flat plate portion by sandwiching the flat plate portion with the head portion of the second holding pawl and the support plate, in addition to the pair of holding pawls. Thus structured, the flat plate portion can be restricted its movement in three dimensional directions, in a right/left direction (X-direction), in an up/down direction (Y-direction) and in a thickness direction (Z-direction) and at the same time the flat plate portion can be held in a thickness direction by sandwiching between the pair of support portions and the second support portion thereby to increase the holding strength of the flat plate portion. Further, when fixing, first the flat plate portion is engaged with the second pawl and then engaged with the pair of holding pawls to easily fix the flat plate portion to the first divided body applying the principle of leverage.

When at least the pair of first holding pawls and the second holding pawl are provided, it is preferable to define the length of distance between the flat surface of the head portion including the surface to contact with the flat plate portion and the flat surface of the support portion to be equal to or less than the thickness of the flat plate portion. By thus defining, at least one of the holding pawls and the flat plate portion is elastically deformed to more give strength to fix the flat plate portion to the first divided body by the elastic reaction force.

When the first divided body is provided with a first connecting pin having a first stepped portion, the second divided body is preferably provided with a second connecting pin which is engaged with the first connecting pin and having a second stepped portion and preferably sandwiching the flat plate portion between the first and the second stepped portions in a thickness direction. Thus the metal plate is further tightly fixed and the flat plate portion can be sealed to be sandwiched from the both sides. This can prevent the foam resin from entering into the inside of the core member upon forming the pad.

It is preferable to provide a tapered surface (guide portion) inclining towards front side surface of the flat plate portion at each surface of the head portions of at least the pair of first holding pawls. Thus, by just pushing the flat plate portion towards the first divided body, the fixing can be easily carried out.

The first divided body, to which the metal plate and the metal stay have been fixed according to the above process, is then fixed to the second divided body. The core member is formed which includes the space provided therein to allow the movement of the pair of leg portions. The fixing means for fixing the first and the second divided bodies is not limited to any particular type and screws or bolts may be used, however, it is preferable to integrate the first and the second divided bodies by only a mechanical engagement connection, such as for example, pawl engagement or the like. By thus structuring, the number of part can be reduced and assembling workability can be improved as well as the recycling can be easily carried out.

It is preferable to arrange the first divided body at the rear side of the head rest apparatus and the second divided body at the front side thereof. Since the head of the occupant of the seat would not be in contact with the rear side of the head rest apparatus, the outer configuration of the first divided body can be freely designed for example to form a larger flat portion thereby to form many contact portions with the flat plate portion of the metal plate. This can further assure the fixing strength.

The core member having the metal plate and the metal stay therein manufactured according to the structure above is properly sealed and inserted into the foam molding die to form a pad made of foam urethane. A bag-like skin portion can be also molded integrally or after molding the pad can be covered by the bag-like skin. Then the pair of leg portions of the metal stay are inserted into the head portion of the seat back and used as a head rest apparatus. By rotating the metal plate around the horizontal rod through the core member, the front/rear position can be adjusted according to the position of the occupant's head position.

EMBODIMENTS OF THE INVENTION

The invention will be explained in detail according to the following embodiments of the invention.

Embodiment 1

Figure 1:
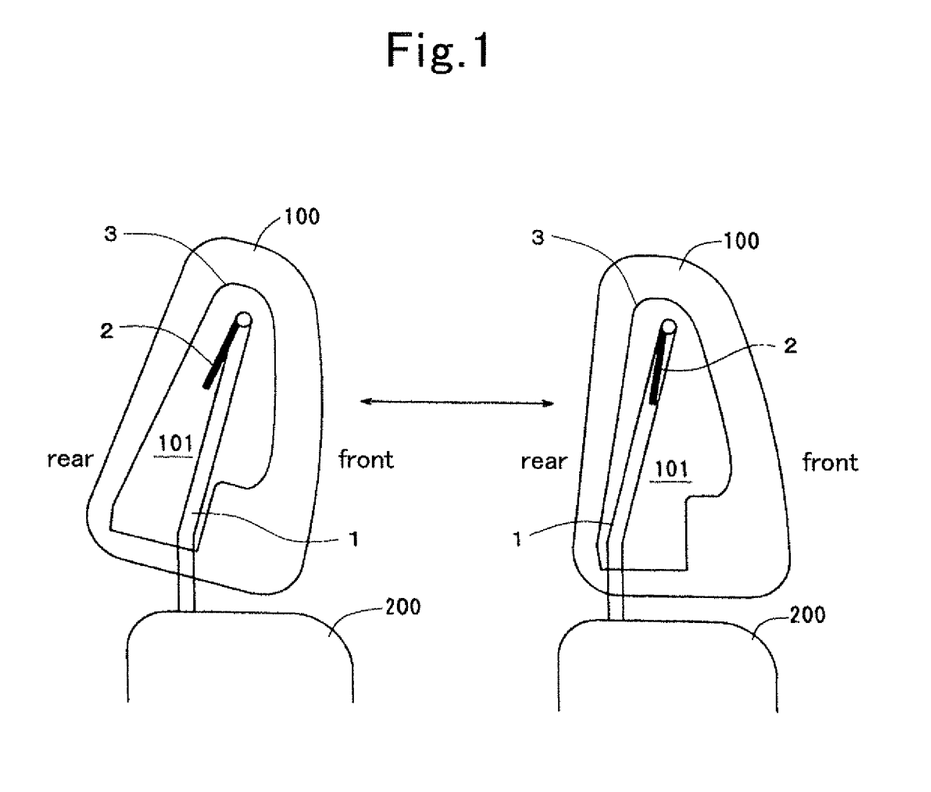
FIG. 1 is an explanatory view of the head rest apparatus under a used state according to an embodiment of the invention.

FIG. 1 is an explanatory view explaining the operation of the head rest apparatus of an embodiment. The head rest apparatus includes a metal stay 1, a metal plate 2 and a core member 3 housed in a head rest main body 100. The metal stay 1 is inserted into a seat back 200 and secured thereto. The metal plate 2 is rotatably supported on the horizontal rod of the metal stay 1 with a frictional resistance and fixed to the core member 3. A space 101 is provided within the core member 3 for allowing the movement of the leg portions of the metal stay 1 therein.

Accordingly, according to this head rest apparatus, by swinging or rotating the core member 3 and the metal plate 2 through the head rest main body 100, the position of the head rest in a front/rear direction can be adjusted as viewed in FIG. 1.

Figure 2:
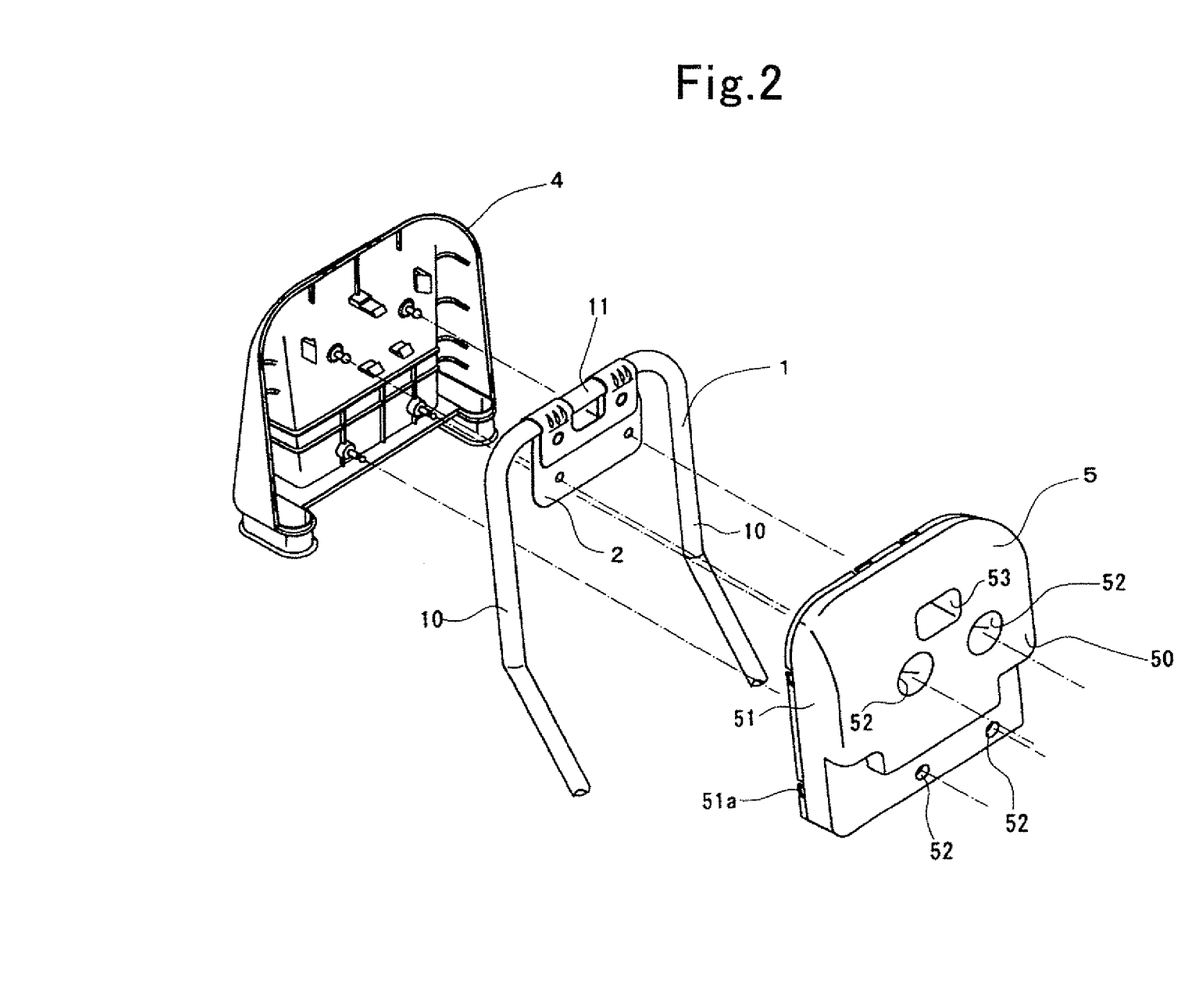
FIG. 2 is an exploded perspective view of the main part of the head rest apparatus according to the embodiment of the invention.

As shown in FIG. 2, the metal stay 1 has a reverse U-shape formed by a pair of leg portions 10 extending in approximately parallel with each other having a space therebetween and a horizontal rod 11 connecting the pair of leg portions 10. The stay 1 is made from a stainless pipe.

Figure 3:
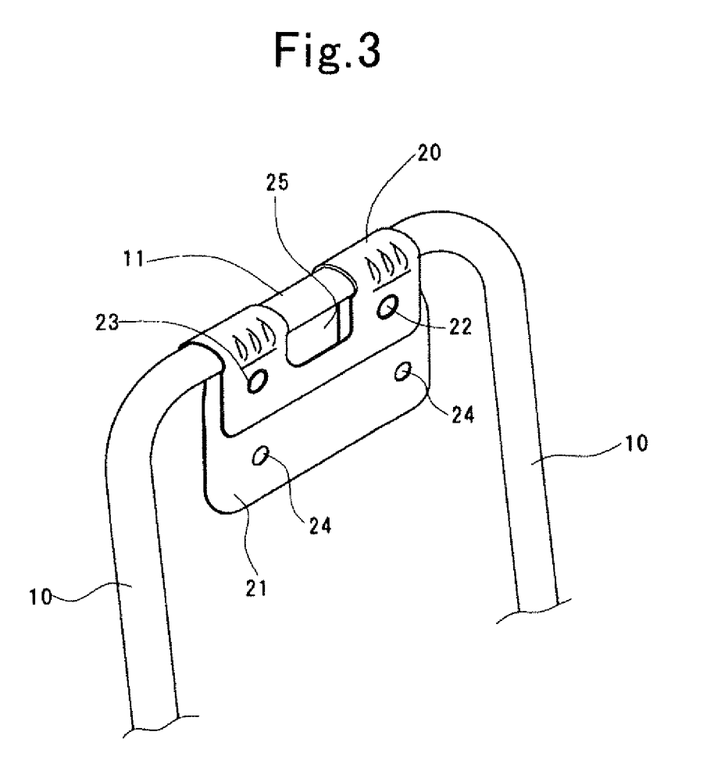
FIG. 3 is an enlarged perspective view of a metal stay, to which a metal plate used in the head rest apparatus according to the embodiment of the invention, is held.

As shown in FIG. 3, the metal plate 2 includes a securing portion 20 secured to and wrapped around the horizontal rod 11 of the metal stay 1 and a rectangular flat plate portion 21 extending from one end of the securing portion 20. A pair of through holes 22 is provided at the other end of the securing portion 20. The other end of the securing portion 20 extends over the flat plate portion 21 and a burring portion 23 projecting from the flat plate portion 21 is inserted into the through hole 22 and then squeezed (riveted) outwardly in a radial direction so that the other end of the securing portion 20 can be fixed to the flat plate portion 21. By adjusting the height of the burring portion 23, the level of rotational friction resistance force of the securing portion 20 relative to the horizontal rod 11 can be defined as desired. A pair of right and left holes 24 is formed on the flat plate portion 21 and into which the later explained first connecting pins 45 are inserted. A window portion 25 is provided at the overlapping area of the flat plate portion 21 and the other end of the securing portion 20, penetrating through the two parts to form a window.

The core member 3 indicates a two-separate part structure and formed by a first divided body 4 and a second divided body 5. As shown in the enlarged view of FIG. 4, the first divided body 4 has an approximately receptacle shape and includes an approximately rectangular shaped flat bottom portion 40, an outer peripheral wall portion 41 surrounding the outer periphery of the bottom portion 40 and a pair of hollow portions 42 provided at both right and left sides of the outer peripheral wall portion 41 and having an elongated hole in cross section. A pair of right and left holding pawls 43 is projecting from the bottom portion 40 and facing with each other. Each holding pawl 43 includes a root portion 43a projecting from the bottom portion 40 and a pair of pawl portions 43b projecting from the tip end of the root portion 43a in a right/left direction facing with each other and a pair of tapered guide surfaces 43c is provided on the front surface of the pawl portions 43b.

Figure 4:
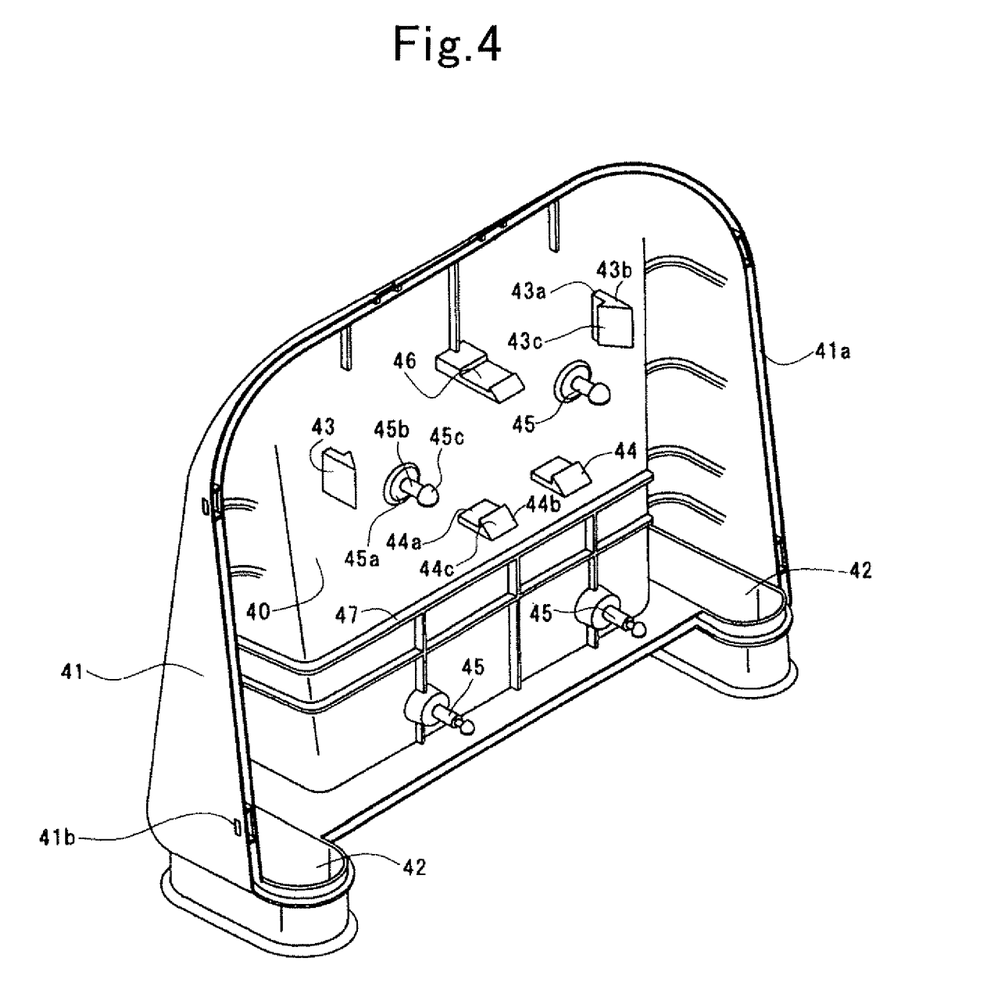
FIG. 4 is an enlarged perspective view of a first divided body used in the head rest apparatus according to the embodiment of the invention.

Further, a pair of second holding pawls 44 is provided at a lower portion relative to the pair of holding pawls 43 facing each other and having a distance therebetween. The second holding pawl 44 includes a root portion 44a, a pawl portion 44b projecting upwardly from the root portion 44a and a tapered guide surface 44c is provided on each front surface of the pawl portions 44b.

Further, four (4) first connecting pins 45 and an engaging pawl portion 46 are formed on the bottom portion 40 and each projecting therefrom. Each first connecting pin 45 includes a stepped portion 45a swollen from the bottom portion 40, a pin portion 45b projecting from the front surface of the stepped portion 45a and an elastically compressible head portion 45c. The engaging pawl portion 46 is formed upright and penetrating through the window portion 25. A plurality of ribs 47 is provided at the bottom portion 40 and the outer peripheral wall portion 41 for supporting the metal stay 1 and giving a reinforcement effect of the structure. Further, a groove portion 41a is consecutively formed on each tip end portion of the three sides of the outer peripheral wall portion 41 and six (6) engaging holes 41b are provided at the outer peripheral side of the wall portion and penetrating through the wall portion in a thickness direction.

Figure 8:
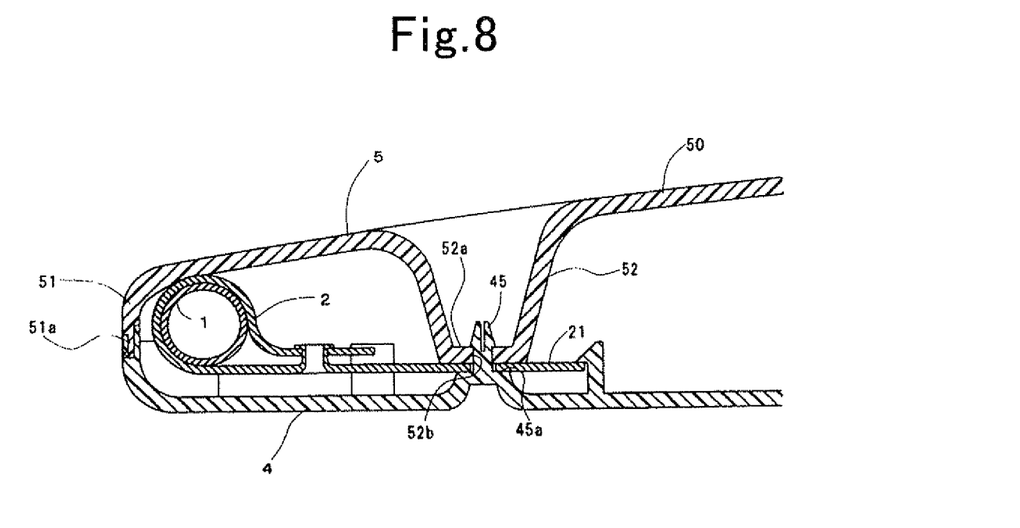
FIG. 8 is a cross sectional view of the main part of the head rest apparatus according to the embodiment of the invention.

The second divided body 5 is formed approximately receptacle shaped and symmetrical with the first divided body 4. The second divided body 5 includes a bottom portion 50 having a convex front surface and an outer peripheral wall portion 51 projecting from the bottom portion 50 and surrounding the outer periphery thereof. Four (4) second connecting pins 52 and a third connecting pin 53 having a rectangular shape in cross section are formed on the bottom portion 50 and projecting in a rear side direction thereof. As shown in FIG. 8, the second connecting pin 52 includes a second stepped portion 52a swollen from the bottom portion 50 and an engaging hole 52b penetrating through a tip end of the second stepped portion 52a in a thickness direction. An engaging hole (not shown) is formed at the tip end of the third connecting pin 53 for engaging with the engaging pawl 46. A plurality of ribs (not shown) is provided at the bottom portion 50 and the outer peripheral wall portion 51 for supporting the metal stay 1 and giving a reinforce effect to the structure. Further, six in total engaging projections 51a are provided at each tip end of the three sides of the outer peripheral wall portion 51 and projecting outwardly having a thickness enough for engaging with the corresponding groove portions 41a.

Figure 5:
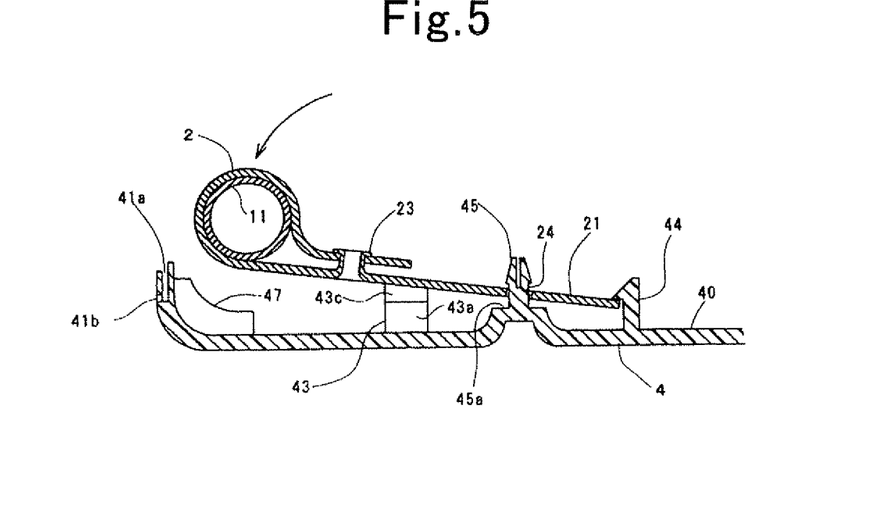
FIG. 5 is a cross sectional view of the main part of the head rest apparatus according to the embodiment of the invention in which the metal stay, to which the metal plate has been held, is being fixed to the first divided body.

The head rest apparatus according to the embodiment is assembled as follows: first preparing a metal stay 1 to which the metal plate 2 is rotatably supported with a friction resistance, positioning the metal stay 1 in the first divided body 4 by inserting the pair of leg portions 10 into the pair of hollow portions 42, at the same time inserting the engaging pawl 46 into the window portion 25 and inserting the pair of right and left first connecting pins 45 at upper side into the pair of right and left holes 24. Then, as shown in FIG. 5, engaging the lower end portion of the flat plate portion 21 with the second holding pawls 44 and engaging the right and left end portions of the flat plate portion 21 with the pair of holding pawls 43. Then pushing the horizontal rod 11 and the securing portion 20 in a direction approaching towards the bottom portion 40. Then the right and left end portions of the flat plate portion 21 is guided by the guide surface 43c and the pair of root portions 43a is deflected outwardly in a right/left direction and elastically deformed so that the right and left end portions of the flat plate portion 21 enter into the underside of the pawl portion 43b. The elastic deformation of the root portions 43a is released and the right and left end portions of the flat plate portion 21 are covered by the pawl portions 43b. The tip end of the flat plate portion 21 is engaged with the second holding pawl 44 to function as a fulcrum point. Thus by applying the principle of leverage, assembling workability can be improved because of a smaller pushing force due to the principle of leverage.

Figure 6:
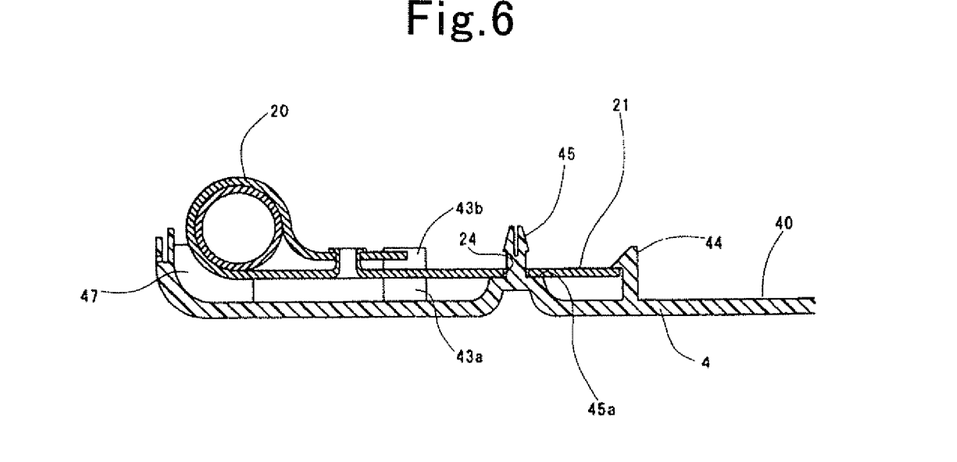
FIG. 6 is a cross sectional view of the main part of the head rest apparatus according to the embodiment of the invention showing the state that the metal stay, to which the metal plate has been held, was fixed to the first divided body.
Figure 7:
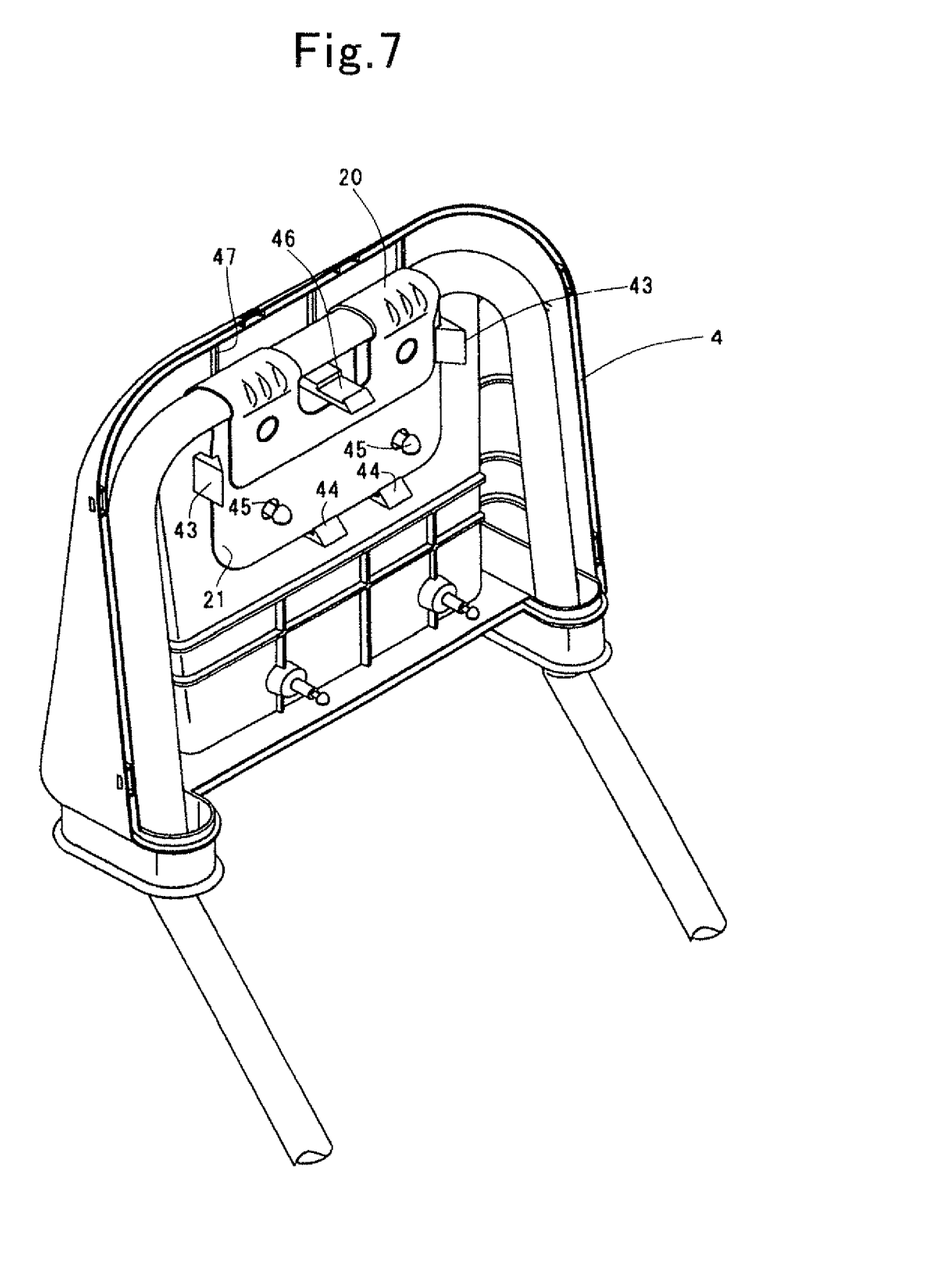
FIG. 7 is a perspective view of the main part of the head rest apparatus according to the embodiment of the invention showing the state that the metal stay, to which the metal plate has been held, was fixed to the first divided body.

Under such assembled condition, as shown in FIGS. 6 and 7, the rear side surface of the flat plate portion 21 is in contact with the stepped portion (support portion) 45a of the first connecting pin 45, the securing portion 20 is in contact with the rib 47 and the flat plate portion 21 is sandwiched between the pawl portion 43b of the pair of right and left holding pawls 43 and the stepped portion 45a and the rib 47. The distance between the underside surface of the pawl portion 43b of the pair of holding pawl 43 and the surface of the stepped portion 45a is set to be the same with the thickness of the flat plate portion 21 and the flat plate portion 21 is in contact with the pair of holding pawl portions 43 between the front surface of the rib 47 and the stepped portion 45a of the first connecting pin 45 to be tightly fixed having three support points. The movement of the flat plate portion 21 and the metal stay 1 relative to the first divided body 4 is restricted by the pair of right and left first connecting pin 45 inserted into the pair of right and left holes 24 and the root portions 44a of the second holding pawls 44. Thus, the flat plate portion 21 can be securely fixed to the first divided body 4.

Next, as shown in FIG. 8, the second divided body 5 is assembled to the first divided body 4. In this case, inserting the tip end of the outer peripheral wall portion 51 of the second divided body 5 into the groove portions 41a at the tip end of the outer peripheral wall portion 41 of the first divided body 4 and engaging the engaging projections 51a with the engaging holes 41b. Then the four first connecting pins 45 and the four second connecting pins 52 are engaged, the engaging pawl 46 and the third connecting pin 53 are engaged. Thus the first and the second divided bodies 4 and 5 are integrally connected. The upper two of the four second connecting pins 52 are in contact with the front side surface of the flat plate portion 21 at the second stepped portions 52a and the flat plate portion 21 is sandwiched by the second stepped portion 52a and the stepped portion 45a.

Accordingly, in the head rest apparatus according to the embodiment of the invention, the flat plate portion 21 is tightly fixed to the first divided body 4 and when the front/rear position of the head rest apparatus is adjusted, by rotating the head rest main body, the horizontal rod 11 of the metal stay 1 is rotated relative to the securing portion 20 of the metal plate 2 to move the pair of leg portions 10 within the pair of hollow portion 42. During the rotation operation or upon vibration, the generated stress applied from the flat plate portion 21 is transmitted only to the first divided body 4 and the stress is absorbed within the first divided body 4. Therefore, no loosening occurs upon the connection between the first and the second divided bodies 4 and 5. Further, since the flat plate portion 21 is sandwiched between the first and the second divided bodies 4 and 5, the operation rattling or generation of abnormal noise can be surely prevented without using any damper member such as slab urethane sheet.

According to thus structured head rest apparatus, the core member 3 integrally holding the metal stay 1 and the metal plate 2 is placed inside of the receptacle shaped skin and sealed properly and then the assembly is placed in the foam forming molding die and foam molding is performed to make the head rest main body 100.

Accordingly, the head rest apparatus of the embodiment, since the flat plate portion 21 is tightly fixed to the first divided body 4, upon rotating the head rest main body 100 for adjusting the front/rearward position thereof, the stress applied from the flat plate portion 21 acts only on the first divided body 4 and the stress is absorbed within the first divided body 4 not to loosen the connection of the first divided body with the second divided body 5. Further, the flat plate portion 21 is also held between the first divided body 4 and the second divided body 5 and accordingly, the rattling in operation or generation of abnormal noise can be surely prevented without using any damper member such as slab urethane sheet.

Embodiment 2

Figure 9:
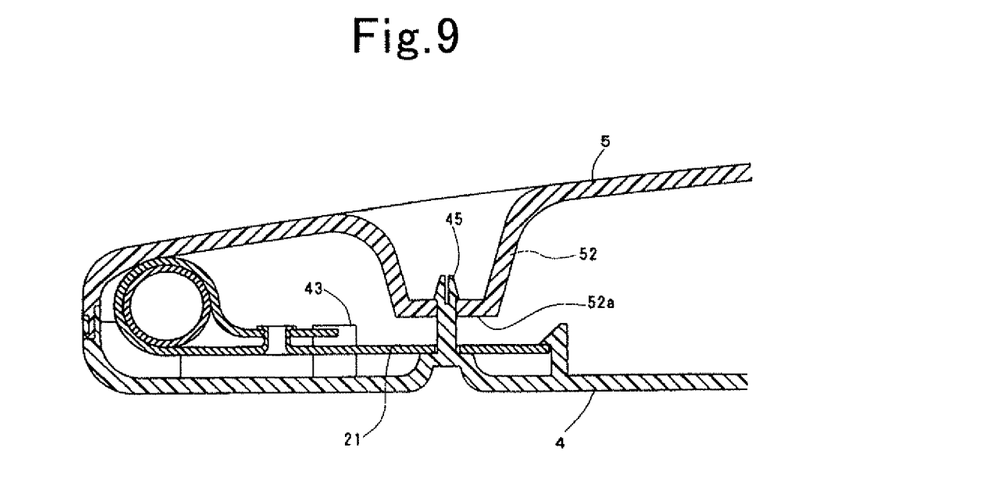
FIG. 9 is a cross sectional view of the main part of the head rest apparatus according to a second embodiment of the invention.

FIG. 9 shows a cross sectional view of the main part of the head rest apparatus according to this embodiment. The head rest apparatus of this embodiment is structured similar to that of the previous embodiment excepting that the upper two second connecting pins 52 among the four second connecting pins 52 of the second divided body 5 are separated from the front side surface of the flat plate portion 21. In this structure, the flat plate portion 21 is also tightly fixed to the first divided body 4 and the stress applied from the flat plate portion 21 upon rotation of the head rest main body 100 acts only on the first divided body 4 and the stress is absorbed within the first divided body 4 not to loosen the connection of the first divided body with the second divided body 5.

Embodiment 3

Figure 10:
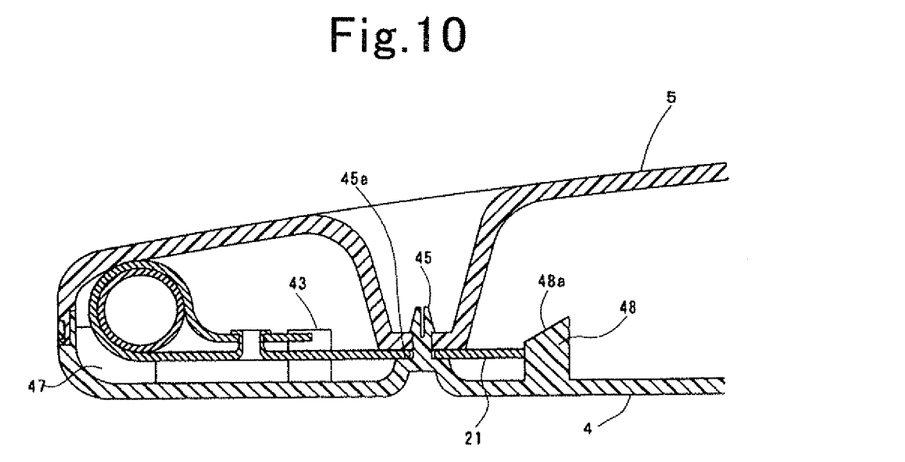
FIG. 10 is a cross sectional view of the main part of the head rest apparatus according to a third embodiment of the invention.

FIG. 10 shows a cross sectional view of the main part of the head rest apparatus according to this embodiment. The head rest apparatus of this embodiment is structured similar to the first embodiment, excepting that instead of providing the second holding pawls 44, a projection 48 having a tapered portion 48a is provided. In this structure, the flat plate portion 21 is in contact with the pair of holding pawls 43 between the front surface of rib 47 and the stepped portion 45a of the first connecting pin 45 and is tightly fixed with three supporting points, and therefore, the stress applied from the flat plate portion 21 upon rotation of the head rest main body 100 acts only on the first divided body 4 and the stress is absorbed within the first divided body 4 to prevent generation of abnormal noise and rattling in operation.

Figure 11:
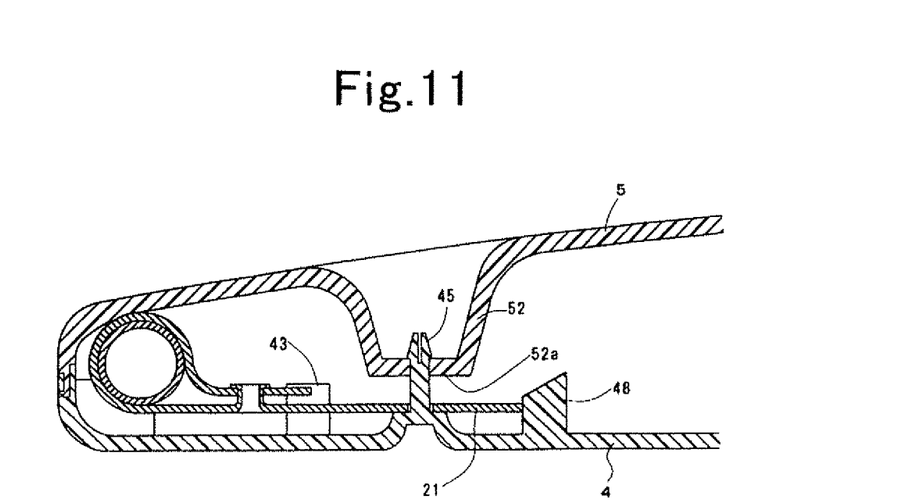
FIG. 11 is a cross sectional view of the main part of the head rest apparatus according to a modified embodiment of the invention.

It is noted that the head rest apparatus structured by combining the head rest apparatus according to the second embodiment with the head rest apparatus according to the third embodiment as shown in FIG. 11 can achieve the same result in operation and effects.

The invention claimed is:

1. A head rest apparatus for automobiles comprising:
a metal stay of approximately reverse U-shaped and having a pair of leg portions extending approximately in parallel with each other and separated with a distance therebetween and a horizontal rod connecting the pair of leg portions,
a metal plate wound around the horizontal rod of the metal stay to generate a predetermined friction resistance thereon and frictionally rotatable relative to the horizontal rod, the metal plate including a securing portion secured to the horizontal rod and a flat plate portion projecting from the securing portion towards the extending direction of the leg portions, and
a core member made of resin and surrounding at least the horizontal rod of the metal stay, the metal plate and a portion of the pair of leg portions, the core member being formed by integrating separately formed first divided body and second divided body and being provided with a space inside thereof for allowing a movement of the pair of leg portions, the first divided body having;
a support portion, the support portion supporting the flat plate portion by bringing into contact with at least a portion of a rear side surface of the flat plate portion,
a rib, the rib contacting with at least a portion of the rear side surface of the securing portion of the metal plate, and
fixing means, the fixing means being formed integrally with the first divided body, the fixing means mechanically engaging the flat plate portion with the first divided body thereby fixing the flat plate portion to the first divided body, the fixing means comprising:
a pair of holding pawls extending from a bottom portion of the first divided body and facing with each other, each holding pawl including:
a root portion facing a respective end surface of the flat plate portion, the end surfaces extending in parallel with each other;
a pawl portion projecting from a tip end of the respective root portion and covering a portion of a front side surface of the flat plate portion, the pawl portions being facing each other, a lower surface of the pawl portion forming a contact surface to be in contact with the front side surface of the flat plate portion; and
a tapered guide surface provided on a front surface of the respective pawl portion;
a second holding pawl extending from the first divided body, the second holding pawl being provided at a lower portion relative to the pair of holding pawls, the second holding pawl including:
a second root portion facing a third end surface of the flat plate portion, the third end surface being different from the end surfaces of the flat plate portion extending in parallel with each other;
a second pawl portion projecting from a tip end of the second root portion and covering a portion of the front side surface of the flat plate portion, a lower surface of the pawl portion forming a second contact surface to be in contact with the front side surface of the flat plate portion;
a second tapered guide surface provided on a front surface of the second pawl portion; and
an engaging pawl portion extending from the bottom portion of the first divided body and penetrating through a window portion of the metal plate, the engaging portion being configured to secure the first divided body to the second divided body;
wherein:
an inclining orientation of the second tapered guide surface intersects with an axis connecting the pair of the tapered guide surfaces,
the flat plate portion is supported by the rib from the rear side surface of the securing portion of the metal plate, by the support portion from the rear side surface of the flat plate portion, and by the lower surfaces of the pair of pawl portions and the lower surface of the second pawl portion from the front side surface of the flat plate portion, thereby a movement of the flat plate portion is restricted in a thickness direction of the flat plate portion,
a movement of the flat plate portion in a second direction connecting the pair of holding pawls is restricted by the root portions of the pair of holding pawls, and
a movement of the flat plate portion in a direction perpendicular to the second direction is restricted by the second root portion of the second holding pawl.

2. The head rest apparatus according to claim 1, wherein the fixing means includes a guide portion guiding the flat plate portion to the contact surface.

3. The head rest apparatus according to claim 1, wherein the support portion is provided at least at two portions of the first divided body and the fixing means is formed between the two support portions.

4. The head rest apparatus according to claim 1, wherein the flat plate portion is of approximately rectangular shape.

5. The head rest apparatus according to claim 4, wherein a distance between the flat surface of the head portion including the surface to contact with the flat plate portion and the flat surface of the support portion is set to be equal to or less than the thickness of the flat plate portion.

6. The head rest apparatus according to claim 4, wherein the first divided body is provided with a first connecting pin having a first stepped portion, the flat plate portion is provided with a through hole into which the first connecting pin is inserted and wherein the first stepped portion constitutes the support portion.

7. The head rest apparatus according to claim 6, wherein the second divided body is provided with a second connecting pin which is engaged with the first connecting pin and having a second stepped portion and the second stepped portion is in contact with the front side surface of the flat plate portion.

8. The head rest apparatus according to claim 4, wherein the front surface of the head portion of the pair of the holding pawls includes a pair of tapered surfaces inclined towards the front side surface of the flat plate portion, respectively and the each tapered surface forms the guide portion.

9. The head rest apparatus according claim 1, wherein the first divided body and the second divided body are connected integrally only by a mechanical engagement connection.

10. The head rest apparatus according to claim 1, wherein the first divided body is arranged at the rear side of the head rest and the second divided body is arranged at the front side of the head rest.

* * * * *